Dec. 12, 1933.　　　　S. P. LYON　　　　1,939,506
AIRCRAFT CONSTRUCTION
Filed Sept. 30, 1930
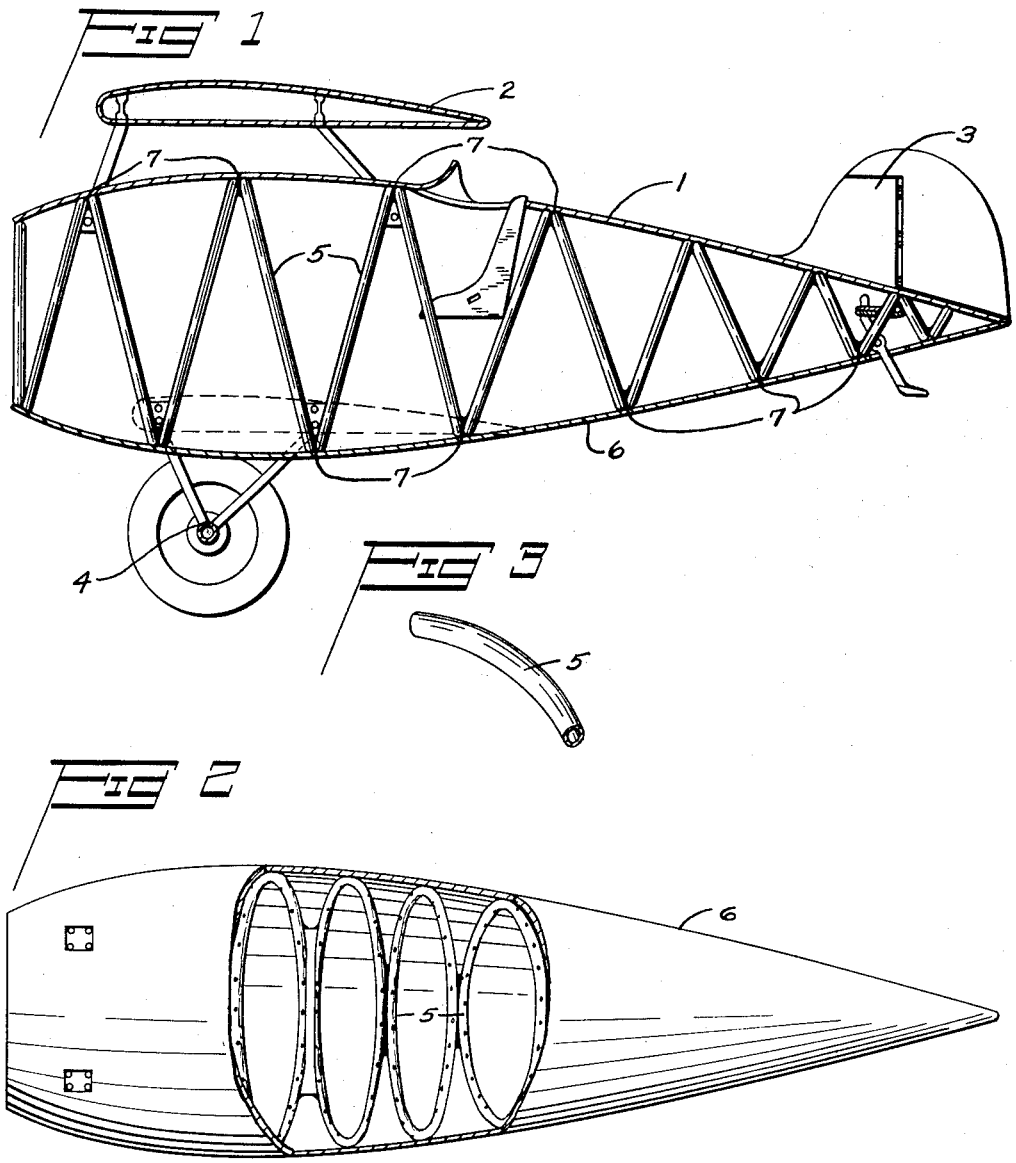
INVENTOR
SIDNEY P LYON
BY Robert H. Young
ATTORNEY Patented Dec. 12, 1933

1,939,506

UNITED STATES PATENT OFFICE 1,939,506

AIRCRAFT CONSTRUCTION

Sidney P. Lyon, Kenmore, N. Y.

Application September 30, 1930
Serial No. 485,518

2 Claims. (Cl. 244—30)

My invention relates to aircraft strut construction and more particularly to the construction of a monocoque type of fuselage.

My invention has for one of its objects to provide a novel streamline strut construction for the fuselage or other parts of an airplane in which a plurality of bulkheads are transversely disposed with respect to the longitudinal axis of the strut and are set at an angle to each other with the extremity of one bulkhead attached to the extremity of an adjacent bulkhead and is provided with a skin covering that is secured to and forms a part of the truss arrangement.

It is a further object of my invention to arrange the bulkheads of a fuselage of this character such that the points of intersection of certain of said bulkheads constitute an attaching point at which the surfaces, landing gear, and other strut members are secured to the fuselage.

Fig. 1 is a side elevation sectional view of a fuselage embodying my invention.

Fig. 2 is a top plan view of the fuselage shown in Fig. 1 with parts removed and the fuselage cover broken away.

Fig. 3 is a perspective fragmentary view showing the cross-sectional structure of the bulkheads in Figs. 1 and 2.

Referring to the drawing, the numeral 1 designates a fuselage which is of the monocoque type and has attached thereto, in a manner hereinafter described, the wings 2, tail surfaces 3, and landing gear 4.

The fuselage 1, which is tubular in cross-section throughout its entire length, is constructed from and consists of a plurality of bulkheads 5, angularly disposed and jointed at their adjacent extremities, with a skin cover 6 secured thereto.

The bulkheads are made from any suitable material such as aluminum alloy or steel bars, which may be of any suitable cross-section and as shown in Fig. 3 are tubular in cross-section. These bulkheads are either circular, elliptical or any configuration, the major and minor axes of the configuration corresponding to the particular cross-section of the fuselage desired. As will be noted in Fig. 1, the major and minor axes of these bulkheads gradually increase from both ends of the fuselage toward the center.

The skin cover 6, which serves as a longitudinal strut, may be made from aluminum alloy or steel and is rigidly secured by welding, riveting, or the like to each of the bulkheads, thus completing the truss between spaced bulkheads.

The joints 7 formed at the intersection of the bulkheads, serve as connecting points for the strut members of the landing gear and the airfoil surfaces.

This type of fuselage construction lends itself to ideal streamline forms and it will be obvious that due to its weight-strength ratio this construction is suitable for rigid type lighter-than-air craft.

While I have shown and described my invention in detail merely for purposes of exemplification, it will be apparent that changes in the details of construction, and in the combination and arrangement of parts may be resorted to by those skilled in the art without departing from the spirit of my invention as herewith claimed.

I claim:

1. In an airplane comprising a fuselage having a plurality of bulkheads spaced apart lengthwise of the fuselage, said bulkheads being angularly disposed and secured at their tops and bottoms to the bulkheads next adjacent thereto, a skin covering secured to peripheral edges of said bulkheads and forming solely therewith a continuous bracing throughout the length of the fuselage, and strut attaching members for the landing gear, wings, and the like secured to points of intersection of said adjacent bulkheads.

2. In an airplane comprising a fuselage having a plurality of bulkheads spaced apart lengthwise of the fuselage, said bulkheads being angularly disposed and secured at their tops and bottoms to the bulkheads next adjacent thereto, a skin covering rigidly secured to said bulkheads and forming solely therewith a truss and strut members for the landing gear, wings, and the like secured to points of intersection of said adjacent bulkheads and to said skin cover.

SIDNEY P. LYON.